Oct. 16, 1962 K. W. CATTERMOLE 3,059,060

ELECTRIC SIGNALLING CIRCUITS

Filed Nov. 8, 1957 3 Sheets-Sheet 1

Inventor
K.W. Cattermole
By John M. Calimafde
Attorney

Inventor
K. W. Cattermole
By John M. Calimafde
Attorney

Oct. 16, 1962 K. W. CATTERMOLE 3,059,060

ELECTRIC SIGNALLING CIRCUITS

Filed Nov. 8, 1957 3 Sheets-Sheet 3

Inventor
K.W. Cattermole
By John M. Calimafde
Attorney

United States Patent Office 3,059,060
Patented Oct. 16, 1962

3,059,060
ELECTRIC SIGNALLING CIRCUITS

Kenneth William Cattermole, London, England, assignor to International Standard Electric Corporation, New York, N.Y., a corporation of Delaware
Filed Nov. 8, 1957, Ser. No. 695,295
8 Claims. (Cl. 179—84)

This invention relates to electric pulse signalling systems.

According to the invention there is provided an electric pulse signalling system which includes a signalling channel or line between two stations, such as a telephone exchange and a subscriber's station, a source of power at a first of the two stations, switching means at a second of the two stations operable to reflect back to the first station power from said source transmitted over the signalling channel from the first station, control equipment for controlling the operation of the switching means, and a detector at the first station operable in response to power reflected to the first station from the second station, whereby the operation of the detector at the first station is controllable by the operation of the control equipment.

Figure 1:
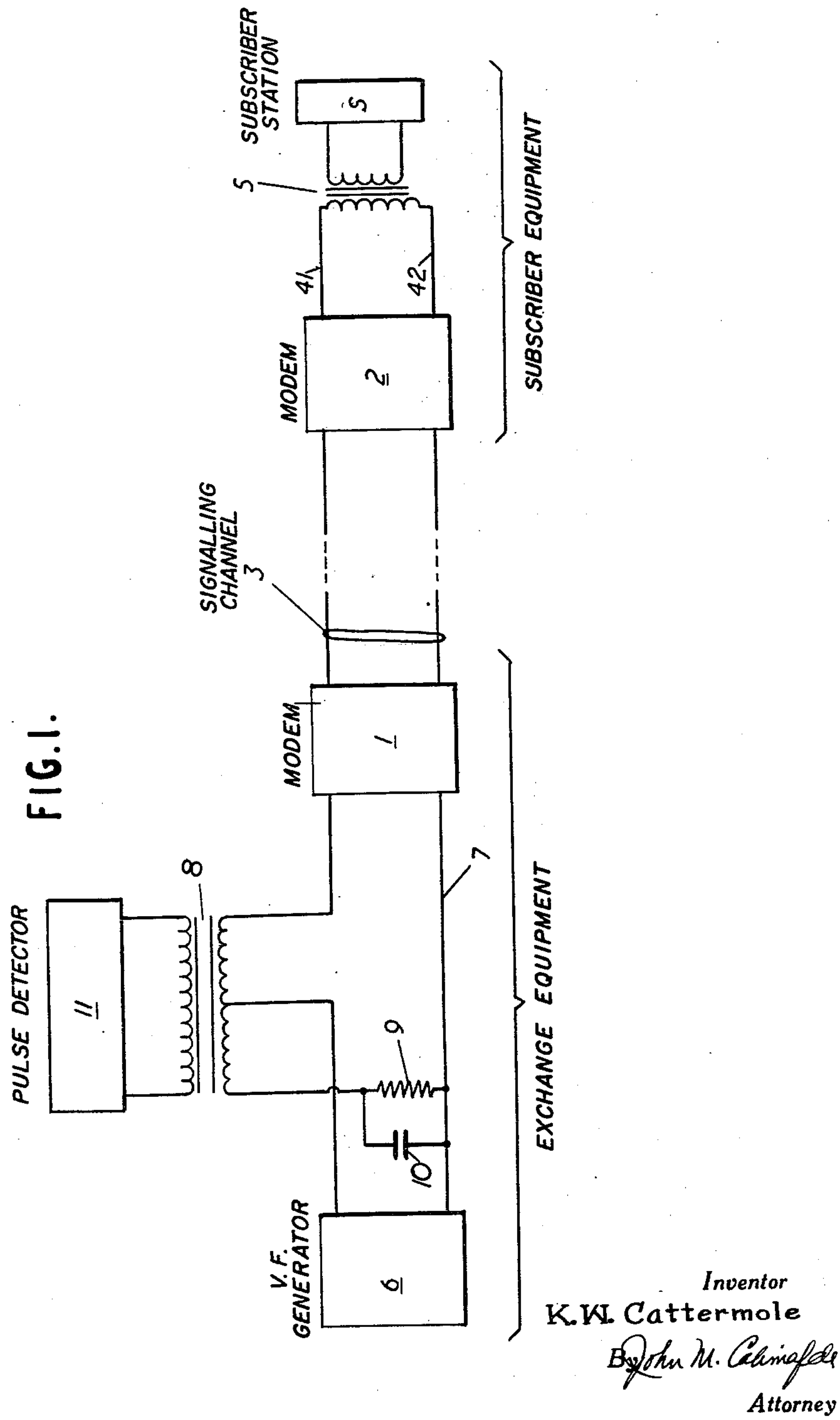
Figure 2:
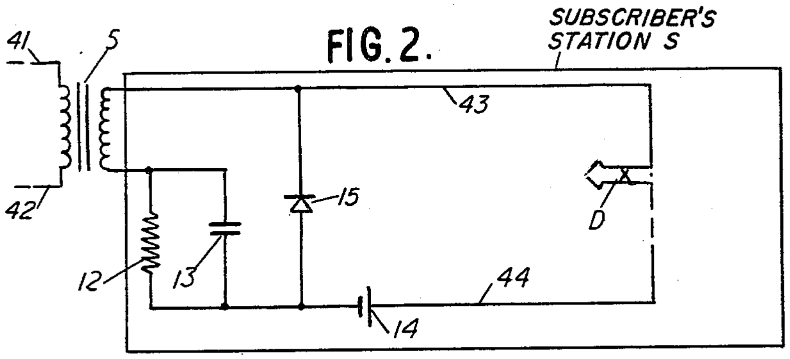
Figure 3:
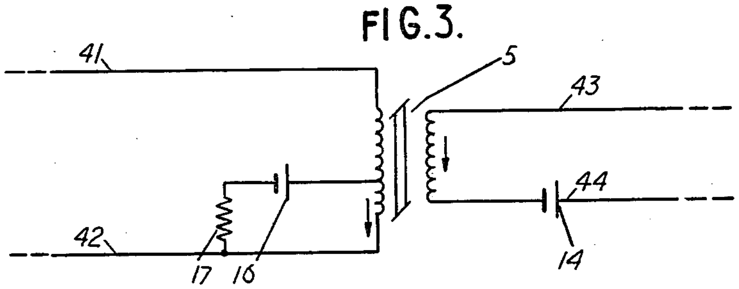
Figure 4:
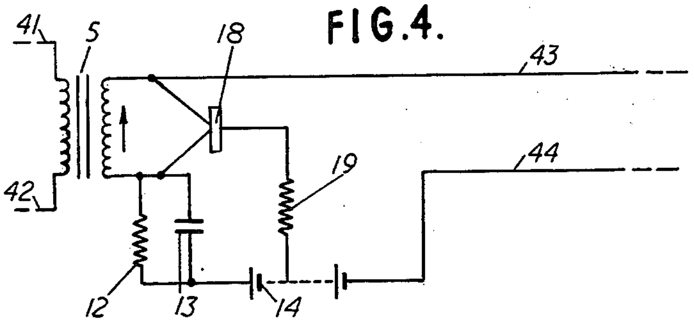
Figure 5:
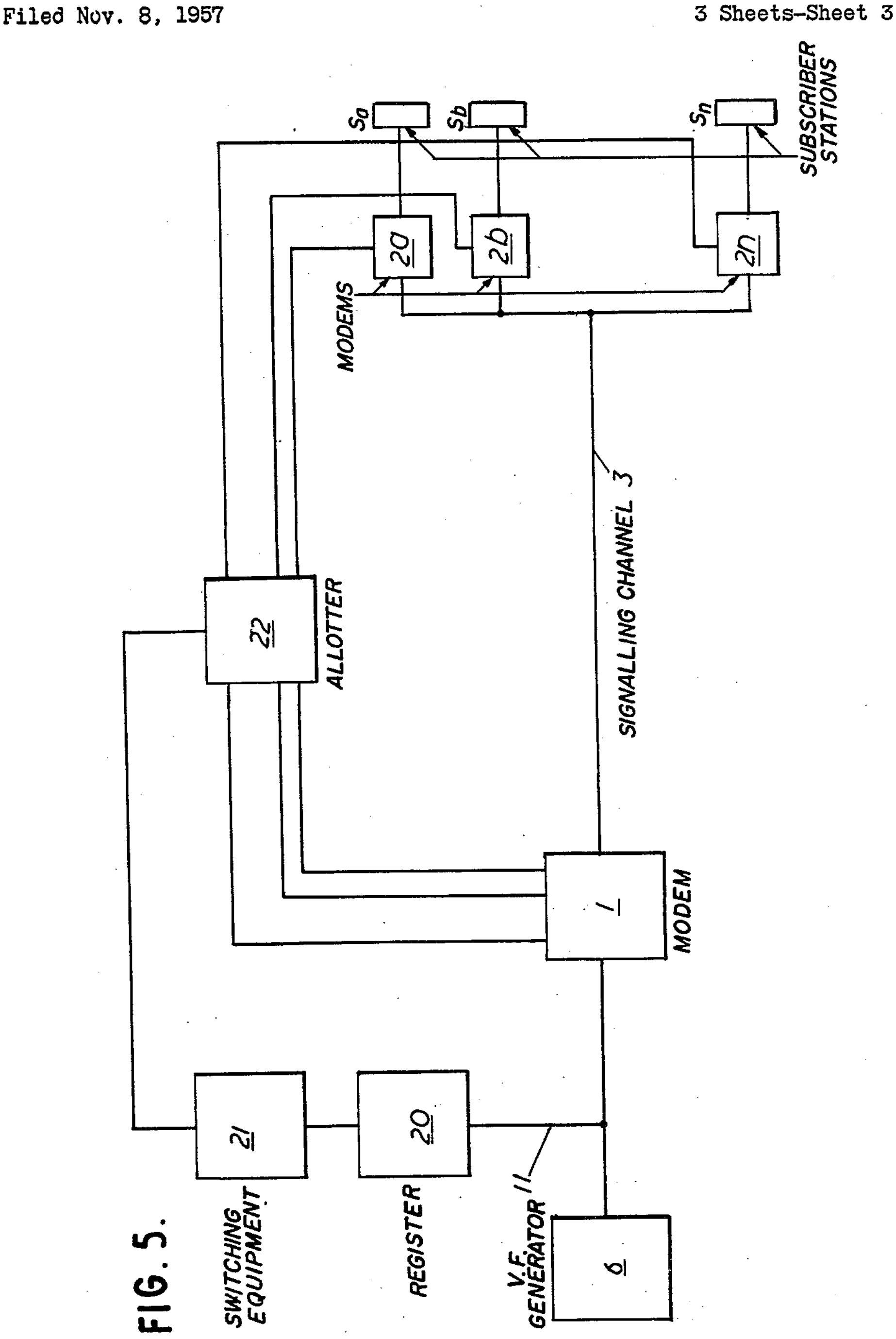

The invention will be described with reference to the accompanying drawings in which:

FIG. 1 is a circuit diagram of an electric pulse signalling system according to the invention, FIGS. 2, 3 and 4 show circuit arrangements for a subscriber's line associated with the system of FIG. 1, FIG. 5 is a schematic diagram showing how the system of FIG. 1 may be embodied in a telecommunication exchange.

In FIG. 1, two pulse modulating and demodulating units or modems 1 and 2 are connected by a signalling channel 3. A signal may be transmitted in either direction in known manner over the signalling channel 3 as a series of pulses, the pulses being formed by modulation of a source message or signal at the transmitting end of the channel, and demodulated at the receiving end so that the original message or signal is re-constituted. A suitable unit for such a system is described in British Patent No. 753,645, dated November 14, 1956. The unit 2 is connected, in accordance with known practice, to a subscriber's stations by means of a transformer 5.

For such a system to be applicable to a telecommunication exchange, it is necessary that it should be possible to transmit dialling impulses from the subscriber's station S to switching equipment in the exchange, and it is advantageous if the dialling impulses can be transmitted over the circuit provided for the transmission of speech signals. In view of the inclusion of the transformer 5 in the speech transmission circuit, it is clearly impossible to use direct current dialling impulses if the dialling impulses are to be transmitted over the speed circuit without substantial waveform alteration.

A voice-frequency generator 6 is therefore provided, one terminal of which is connected by a lead 7 direct to one terminal of the unit 1. The other terminal of the generator 6 is connected to an intermediate point in one winding of a transformer 8. One end of the winding is connected to the unit 1. The other end of the winding is connected to the lead 7 by a balancing network consisting of a resistor 9 in parallel with a capacitor 10. The secondary winding of the transformer 8 is connected to an output circuit or pulse detector 11.

A load circuit for the generator 6 is therefore provided which includes one winding of the transformer 8, the unit 1, one leg of the channel 3, the unit 2, the transformer 5, station S, the transformer 5, the unit 2, the other leg of the channel 3, the unit 1 and the lead 7.

The point in the primary winding of the transformer 8 to which the generator 6 is connected, and the values of the resistor 9 and the capacitor 10 are chosen so that, when the generator 6 is connected to the load circuit just described, the currents generated in the two portions of the primary winding of the transformer 8 are equal and opposite, and no effective current flows in the load circuit. Under these conditions no current is delivered from the secondary winding of the transformer 8 to the output circuit 11.

Suppose now that the characteristics of the subscriber's station S are substantially changed e.g. by opening a contact D (FIG. 2) so as to break the loop. Under these conditions, the load presented by the transformer 5 is reflected back over the channel 3 and the unit 1, and upsets the balance between the currents generated in the two portions of the primary winding of the transformer 8. An output is consequently induced in the secondary winding of the transformer 8 and is passed to the output circuit or pulse detector 11.

If the application and removal of the mis-match are controllable by the dial of a telephone or teleprinter at the subscriber's station S, and if the output circuit 11 is connected to switching equipment in a telecommunication exchange, the operation of the switching equipment may be determined by the operation of the dial. Various methods of applying a mis-match will now be described.

Referring to FIG. 2, one end of one winding of the transformer 5 is connected direct to one side of the dial D over conductor 43. The other end is connected by a resistor 12 in parallel with a capacitor 13 to one pole of a battery 14. The other pole of the battery 14 is connected to the other side of the dial D over conductor 44. A rectifier 15 is shunted across the resistor 12 and the winding of the transformer 5. The battery 14 provides speaking current for the subscriber's loop and, by means of the resistor 12, a potential by which the rectifier 15 is biased to its non-conducting condition. The condenser 13 provides a low-impedance path for speech signals.

If now the loop at the subscriber's station S is broken by the opening of the dial contacts D, current from the battery 14 ceases to flow, and the blocking bias is removed from the rectifier 15. The short circuit through the rectifier 15 provides a mis-match for the transformer 5. If alternating current originated by the generator 6 (FIG. 1) arrives from the unit 2 at the transformer 5, the energy of alternate half-cycles is reflected back to appear as an output signal in the output circuit 11 (FIG. 1).

If it is desired to reflect back both half-cycles it is necessary to provide an additional rectifier arranged in the opposite sense to the rectifier 15, so that no current flows in the short circuit during either half-cycle. An auxiliary circuit would be required to obtain the biassing potential for the second rectifier.

FIG. 3 shows an alternative method is to make the transformer 5 of the saturable type, and to increase instead of opening the current through the subscriber's station S during a dialling impulse. With this arrangement the transformer 5 functions in known manner to transmit speech signals. On the other hand, when the transformer is saturated during a dialling impulse, a mismatch is produced and incident power is reflected back to produce a signal in the output circuit 11. The increase of current during a dialling impulse may be brought about by closing contacts in a low resistance shunt circuit at the subscriber's telephone for duration of the impulse.

To obtain a sharp distinction between the saturated and unsaturated condition of the transformer 5 it is helpful to provide a compensating current in the transformer 5 to balance the current normally flowing in the subscriber's station S. Such an arrangement is shown in FIG. 3. The balancing current flows through part of the coil of the transformer 5 which is connected to the unit 2 and is provided by a battery 16 in series with a regulating resistor 17. The arrows show the directions of flow of the line and balancing currents. Without the balancing current, the line current would tend to de-saturate the transformer 5 during alternate half-cycles of the power originated by the generator 6. The arrangement of FIG. 3 is particularly suited for use in an exchange using electronic switching.

A further method is shown in FIG. 4. The emitter and collector of a transistor 18 are connected in parallel with a winding of the transformer 5. A resistor 12 in parallel with a capacitor 13 is connected in series with the winding of the transformer 5 and a battery 14 from which speaking current is supplied to the subscriber's station S. A tapping from the battery 14 is taken through a resistor 19 to the base of the transistor 18. The values of the resistors 12 and 19 are such that the transistor 18 is in its conductive condition when the loop formed by the subscriber's station S is broken.

When the subscriber lifts his receiver (not shown) the loop is closed, and speaking current flows from the battery 14 in the direction of the arrow, inducing potentials which render the transistor 18 non-conductive. When the loop is broken by a dialling impulse, the transistor 18 becomes conductive, short-circuiting the transformer 5 and causing reflection of the power produced by the generator 6 (FIG. 1) in the manner already described.

FIG. 5 is a schematic diagram showing the arrangement of FIG. 1 embodied in a telecommunication exchange. Subscribers' stations *Sa*, *Sb* . . . *Sn* incoming to the exchange are connected to individual pulse modulating and de-modulating units 2*a*, 2*b* . . . 2*n*, which in turn are connected over a common signalling channel 3 to a pulse modulating and de-modulating unit 1. The modem 2 of FIG. 1 and the modems 2*a* to 2*n* of FIG. 5 may be located within the exchange or at the subscriber premises. In FIG. 5, it is preferred that the modems constitute exchange apparatus in order to reduce the number of line wires. A generator 6 is connected to the unit 1, and an output circuit 11, connected as already described, is lead to a register 20 having access to switching equipment 21. An allotter 22 is connected to each of the units 2*a*, 2*b* . . . 2*n* and to the switching equipment 21.

When a subscriber lifts his receiver to make a call, the allotter 22 allots a time position in the pulse cycle to the call, so that when the allotted time position is reached in each pulse cycle, the calling subscriber's station say *Sa*, is connected over the signalling channel 3 to the unit 1. Dialling then takes place in the manner already described. The dialled number is received in the register 20 by which the operation of the switching equipment 21 is controlled. When the switching equipment 21 has selected the called number, the allotter 22 allots the time position for the call to the unit, say 2*n*, associated with the called subscriber's line. Thereafter, when the allotted time position is reached in subsequent pulse cycles, the unit 2*a* is connected direct to the unit 2*n*. The other equipment, that is to say, the signalling channel 3, the unit 1, the generator 6, the output circuit 11, the register 20, the switching equipment 21 and the allotter 22, is released.

While the principles of the invention have been described above in connection with specific embodiments, and particular modifications thereof, it is to be clearly understood that this description is made only by way of example and not as a limitation on the scope of the invention.

What I claim is:

1. In a signalling system for transmitting supervisory signals and pulse modulated speech signals over a telephone line interconnecting an exchange and a remote station, a supervisory signal power source at said exchange, first power transfer means at said exchange and second power transfer means at said station, means including the said first power transfer means for transmitting power in pulse form from said power source to said station, load means in said station for absorbing the power transferred to said station, signalling means at said station for reducing the power absorbing characteristics of said load means, means including the said second power transfer means and responsive to the operation of said signalling means for transferring the unabsorbed power at said station to said exchange, and detector means in said exchange for detecting said transferred unabsorbed power to provide an indication of each operation of the said signalling means.

2. A signalling system as set forth in claim 1 wherein each said power transfer means include modulating and demodulating means.

3. A signalling system as set forth in claim 1 wherein said load means includes balancing means for matching the impedance of aid load means to the impedance of said power source.

4. A signalling system as set forth in claim 3 wherein operation of said signalling means mismatches the impedance of the said load and the impedance of said source.

5. A signalling system as set forth in claim 1 wherein said signalling means includes dial contacts.

6. A signalling system as set forth in claim 1 wherein said load means includes a first winding of a transformer and wherein the said signalling means includes a second winding of said transformer.

7. A signalling system as set forth in claim 6 wherein said transformer includes a saturable core and wherein operation of said signalling means induces a saturated condition in said transformer to thereby induce an impedance change in the said first transformer winding.

8. A signalling system as set forth in claim 6 wherein operation of said signalling means short-circuits the said second transformer winding to thereby induce an impedance change in the said first transformer winding.

References Cited in the file of this patent

UNITED STATES PATENTS

| | | |
|---|---|---|
| 2,085,418 | Crosby | June 29, 1937 |
| 2,384,336 | Pfleger | Sept. 4, 1945 |
| 2,548,211 | Frantz | Apr. 10, 1951 |
| 2,733,299 | Staples | Jan. 31, 1956 |
| 2,854,514 | Ensink | Sept. 30, 1958 |

FOREIGN PATENTS

| | | |
|---|---|---|
| 525,462 | Great Britain | Aug. 28, 1940 |

UNITED STATES PATENT OFFICE
CERTIFICATE OF CORRECTION

Patent No. 3,059,060 October 16, 1962

Kenneth William Cattermole

It is hereby certified that error appears in the above numbered patent requiring correction and that the said Letters Patent should read as corrected below.

In the heading to the printed specification, between lines 6 and 7, insert the following:

Claims priority, application Great Britain Dec. 14, 1956

Signed and sealed this 9th day of April 1963.

(SEAL)
Attest:

ESTON G. JOHNSON
Attesting Officer

DAVID L. LADD
Commissioner of Patents